US012666130B2

(12) United States Patent     (10) Patent No.:   US 12,666,130 B2

Hada     (45) Date of Patent:     Jun. 23, 2026

(54) INFORMATION PROCESSING APPARATUS AND INFORMATION PROCESSING METHOD

(71) Applicant: CANON KABUSHIKI KAISHA, Tokyo (JP)

(72) Inventor: Tetsuya Hada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 285 days.

(21) Appl. No.: 18/509,488

(22) Filed: Nov. 15, 2023

(65) Prior Publication Data

US 2024/0171844 A1     May 23, 2024

(30) Foreign Application Priority Data

Nov. 21, 2022    (JP) ................................. 2022-185404

(51) Int. Cl.
*H04N 23/60*     (2023.01)

(52) U.S. Cl.
CPC .................................. *H04N 23/60* (2023.01)

(58) Field of Classification Search
CPC ...................................................... H04N 23/60
USPC ...................................................... 348/207.99
See application file for complete search history.

(56) References Cited

FOREIGN PATENT DOCUMENTS

JP     2015-154636 A    8/2015
JP     2020-046822 A    3/2020

*Primary Examiner* — Joel W Fosselman
(74) *Attorney, Agent, or Firm* — Cowan, Liebowitz & Latman, P.C.

(57) ABSTRACT

An information processing apparatus includes at least one memory and at least one processor which function as: an acquisition unit configured to acquire first information which includes information on use count of operation members of a first electronic apparatus, or to acquire second information which includes information on use count of operation members of a second electronic apparatus; and a determination unit configured to determine, based on the first information or the second information, a second operation member of the second electronic apparatus, to which setting for a first operation member of the first electronic apparatus is applied, in a case where settings for the operation members of the first electronic apparatus are applied to the operation members of the second electronic apparatus.

17 Claims, 12 Drawing Sheets

TRANSFER SOURCE                   TRANSFER DESTINATION

TRANSFER
SOURCE

TRANSFER
DESTINATION

FIG. 5A

OPERATION MEMBER ARRANGEMENT INFORMATION
OF TRANSFER SOURCE CAMERA

| OPERATION MEMBER POSITION | OPERATION MEMBER NAME (ID) |
| --- | --- |
| REAR SURFACE, 90° (AF-ON), 0.7cm | AE LOCK |
| REAR SURFACE, 170° (AF-ON), 3.8cm | SET |
| REAR SURFACE, 190° (AF-ON), 4.0cm | REPRODUCTION |
| REAR SURFACE, 210° (AF-ON), 2.2cm | INFO |

FIG. 5B

OPERATION MEMBER ARRANGEMENT INFORMATION
OF TRANSFER DESTINATION CAMERA

| OPERATION MEMBER POSITION | OPERATION MEMBER NAME (ID) |
| --- | --- |
| REAR SURFACE, 80° (AF-ON), 0.7cm | AE LOCK |
| REAR SURFACE, 180° (AF-ON), 3.5cm | SET |
| REAR SURFACE, 185° (AF-ON), 4.2cm | REPRODUCTION |
| REAR SURFACE, 210° (AF-ON), 2.4cm | MAGNIFICATION |
| REAR SURFACE, 240° (AF-ON), 1.8cm | INFO |

FIG. 6A

SETTING INFORMATION OF TRANSFER SOURCE CAMERA

| OPERATION MEMBER NAME (ID) | ASSIGNED FUNCTION | USE COUNT |
|---|---|---|
| AE LOCK | AE LOCK/FE LOCK | 250 |
| SET | FOCUS MODE | 92 |
| REPRODUCTION | PROTECT | 23 |
| INFO | DISPLAY INFORMATION CHANGE | 5 |

FIG. 6B

SETTING INFORMATION OF TRANSFER DESTINATION CAMERA

| OPERATION MEMBER NAME (ID) | ASSIGNED FUNCTION | USE COUNT |
|---|---|---|
| AE LOCK | AE LOCK/FE LOCK | 136 |
| SET | FOCUS MODE | 45 |
| REPRODUCTION | PROTECT | 13 |
| MAGNIFICATION | DISPLAY INFORMATION CHANGE | 4 |

FIG. 6C

SETTABLE INFORMATION OF TRANSFER DESTINATION CAMERA

| OPERATION MEMBER NAME (ID) | ASSIGNABLE FUNCTION |
|---|---|
| AE LOCK | AE LOCK/FE LOCK |
|  | PHOTOMETRY AND AF START |
|  | AF STOP |
|  | AE LOCK AND AF STOP |
|  | AF FRAME SELECTION |
| SET | FOCUS MODE |
|  | AF FRAME SELECTION |
|  | AF FRAME RETURN TO CENTER |
|  | AF AREA DIRECT SELECTION |
| REPRODUCTION | IMAGE REPRODUCTION |
|  | PROTECT |
| MAGNIFICATION | MAGNIFIED DISPLAY |
|  | DISPLAY INFORMATION CHANGE |

AE LOCK/FE LOCK IS ASSIGNABLE TO
FOLLOWING BUTTONS

·AF START
·MULTI-FUNCTION

ASSIGN?

| CANCEL | OK |

↓ OK

SELECT BUTTON TO BE ASSIGNED

| AF START | MULTI-FUNCTION |

BUTTON CUSTOMIZE

AF START BUTTON
PHOTOMETRY AND AF START

803

801

802

STILL IMAGE        MOVING IMAGE

REC : REC

AF-ON : AF        AF-ON : AF

M-Fn: DIAL FUNC        M-Fn: DIAL FUNC

200
TRANSFER
SOURCE

300

500
CLOUD SERVER

100
TRANSFER
DESTINATION

TRANSFER SOURCE

TRANSFER DESTINATION

INFORMATION PROCESSING APPARATUS AND INFORMATION PROCESSING METHOD

BACKGROUND OF THE INVENTION

Field of the Invention

The present invention relates to an information processing apparatus and an information processing method.

Description of the Related Art

Conventionally, techniques to set an electronic apparatus using setting data of a different model have been proposed. For example, Japanese Patent Application Publication No. 2020-46822 discloses a system of estimating a candidate of a conversion rule for converting setting information out of predetermined conversion rules.

Further, Japanese Patent Application Publication No. 2015-154636 discloses a system of setting various parameters to implement similar characteristics of functions and performance, based on a parameter conversion table.

However, a number of members included in an electronic apparatus and functions that can be set for operation members differ depending on the model. Therefore in some cases, it is difficult to transfer the setting information of a different model without diminishing operability of the user that depends on the operation state.

SUMMARY OF THE INVENTION

The present invention provides an information processing apparatus that implements the transfer of setting information of an electronic apparatus without diminishing operability of the user.

An information processing apparatus according to the present invention includes at least one memory and at least one processor which function as: an acquisition unit configured to acquire first information which includes information on use count of operation members of a first electronic apparatus, or to acquire second information which includes information on use count of operation members of a second electronic apparatus; and a determination unit configured to determine, based on the first information or the second information, a second operation member of the second electronic apparatus, to which setting for a first operation member of the first electronic apparatus is applied, in a case where settings for the operation members of the first electronic apparatus are applied to the operation members of the second electronic apparatus.

Further features of the present invention will become apparent from the following description of exemplary embodiments with reference to the attached drawings.

BRIEF DESCRIPTION OF THE DRAWINGS

FIGS. 5A and 5B are tables exemplifying the arrangement information of the operation members of the cameras;

FIGS. 6A to 6C are tables exemplifying setting information of the operation members of the cameras;

DESCRIPTION OF THE EMBODIMENTS

Embodiment 1

Figure 1:
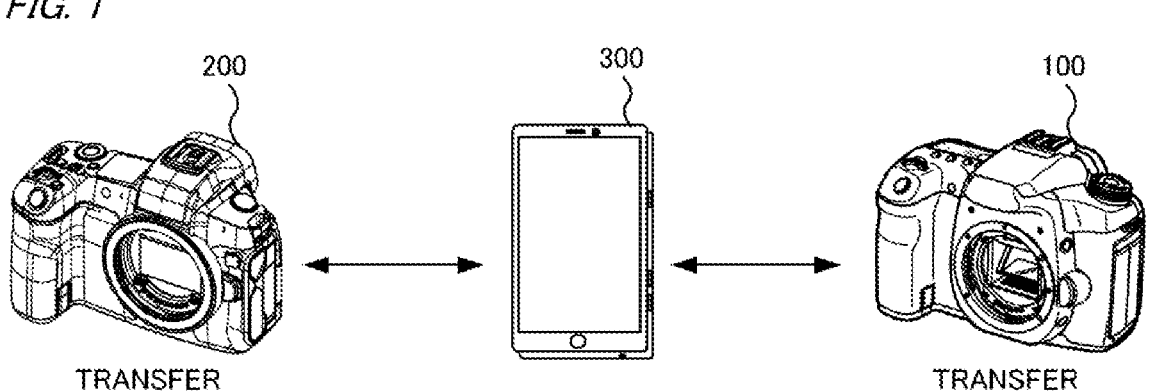
FIG. 1 is a diagram exemplifying a configuration of an information processing system of Embodiment 1.

FIG. 1 is a diagram exemplifying a configuration of an information processing system according to Embodiment 1. The information processing system includes a camera 100 (imaging apparatus) and a camera 200, which are electronic apparatuses, and a smartphone 300, which is an information processing apparatus. The smartphone 300 determines an operation member of the camera 100 (setting information transfer destination) to which setting of an operation member of the camera 200 (setting information transfer source) is applied.

The camera 100 and the camera 200 are communicably connected to the smartphone 300 respectively. Connection of the camera 100 and the camera 200 to the smartphone 300 may be a cable connection using such cable as USB or LAN, or may be a wireless connection using Wi-Fi, Bluetooth®, or the like. For the communication protocol, precision time protocol (PTP), hypertext transfer protocol (HTTP) or the like may be used.

Figure 2:
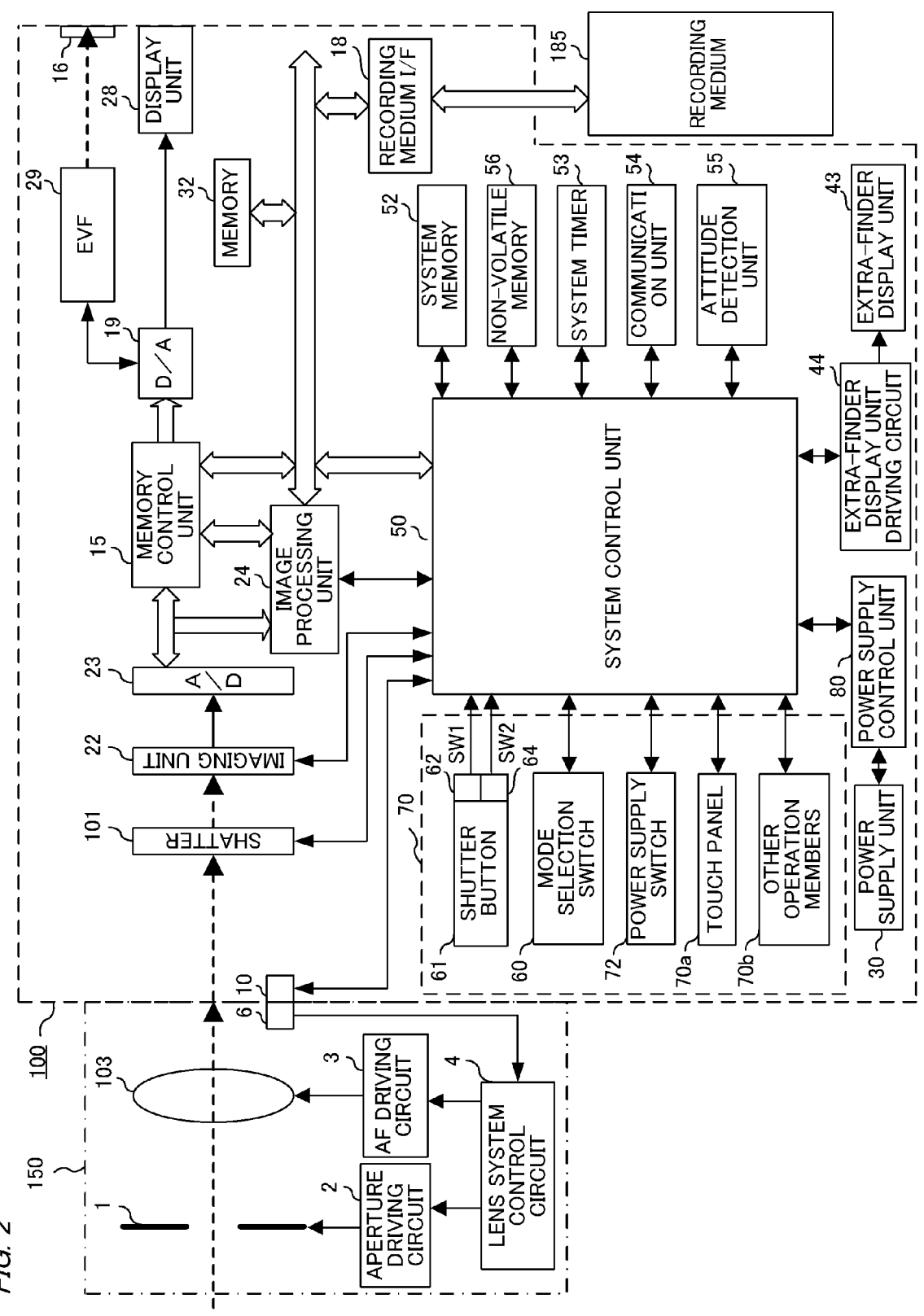
FIG. 2 is a block diagram depicting a configuration example of a camera.

FIG. 2 is a block diagram depicting a configuration example of the camera 100, which is an electronic apparatus. The camera 200 has the same configuration as the camera 100. A lens unit 150 is a lens unit mounting replaceable image capturing lenses. A lens 103 is normally constituted of a plurality of lenses, but is indicated as one lens in FIG. 2 for simplification.

A communication terminal 6 is a communication terminal for the lens unit 150 to communicate with the camera 100, and a communication terminal 10 is a communication terminal for the camera 100 to communicate with the lens unit 150. The lens unit 150 communicates with a system control unit 50 via these communication terminals 6 and 10. The lens unit 150 controls an aperture 1 via an aperture driving circuit 2, using an internal lens system control circuit 4. The lens unit 150 also performs focusing, by changing the position of the lens 103 via an AF driving circuit 3, using the lens system control circuit 4.

A shutter 101 is a focal plane shutter that can freely control an exposure time of an imaging unit 22 based on the control of the system control unit 50, for example.

The imaging unit 22 is an image pickup element (image sensor) constituted of a CCD, an CMOS element, or the like, to convert an optical image into electric signals. The imaging unit 22 may include an imaging-plane phase-difference sensor, which outputs defocus amount information to the system control unit 50. An A/D convertor 23 converts an analog signal, which is outputted from the imaging unit 22, into a digital signal.

An image processing unit 24 performs predetermined processing (e.g. pixel interpolation, resize processing (e.g. demagnification), color conversion processing) on data from the A/D convertor 23, or data from a memory control unit 15. The image processing unit 24 also performs predetermined arithmetic processing using the captured image data. The system control unit 50 performs exposure control and distance measurement control based on the arithmetic operation result acquired by the image processing unit 24. Thereby a through-the-lens (TTL) type auto focus (AF) processing, auto exposure (AE) processing, pre-flash emission (FE) processing, and the like are performed. Furthermore, the image processing unit 24 performs predetermined arithmetic processing using the captured image data, and performs TTL type auto white balance (AWB) processing based on the acquired arithmetic operation result.

The output data from the A/D convertor 23 is written to a memory 32 via the image processing unit 24 and the memory control unit 15. The output data from the A/D convertor 23 may be written to the memory 32 via the memory control unit 15 alone without using the image processing unit 24. The memory 32 stores: image data, which is acquired by the imaging unit 22 and converted into digital data by the A/D convertor 23; and image data to be displayed on a display unit 28 and an EVF 29. The memory 32 has a storage capacity that is sufficient for storing a predetermined number of still images and a predetermined duration of moving images and sound.

The memory 32 also plays a role of memory for displaying images (video memory). A D/A convertor 19 converts image data for display, stored in the memory 32, into analog signals, and supplies the analog signals to the display unit 28 and the EVF 29. Thus the image data for display, written in the memory 32, is displays on the display unit 28 and the EVF 29 via a D/A convertor 19. The display unit 28 and the EVF 29 are such displays as a liquid crystal display (LCD) or an organic EL, and performs display in accordance with the analog signals from the D/A convertor 19. An eyepiece unit 16 is an eyepiece unit of an eyepiece finder (look-in type finder), and the user can view an image displayed on the internal EVF 29 through the eyepiece unit 16.

Digital signals, which were A/D-converted by the A/D convertor 23 and stored in the memory 32 are converted into analog signals by the D/A convertor 19, and are sequentially transferred to the display unit 28 or the EVF 29. The display unit 28 or the EVF 29 can perform live view display (LV) using the transferred analog signals. The image displayed by the live view display is called a "live view image" (LV image).

A non-volatile memory 56 is an electrically erasable/recordable memory, such as an electrically erasable programmable read-only memory (EEPROM). The non-volatile memory 56 stores constants, programs, operation member arrangement information and the like for operating the system control unit 50. "Programs" here refers to programs for executing various flow charts to be described later in the present embodiment.

The system control unit 50 is a control unit constituted of at least one processor and/or at least one circuit, and controls the camera 100 in general. The system control unit 50 is both a processor and a circuit. The system control unit 50 implements each processing of the present embodiment by executing programs recorded in the non-volatile memory 56.

A system memory 52 is a random access memory (RAM), for example. The system control unit 50 develops constants and variables for operating the system control unit 50, programs read from the non-volatile memory 56, and the like in the system memory 52. Further, the system control unit 50 also performs display control by controlling the memory 32, the D/A convertor 19, the display unit 28, the EVF 29, and the like. A system timer 53 is a timer unit to measure the time used for various controls, and to measure the time of the internal clock.

A communication unit 54 performs transmission/reception of various data, such as image signals, audio signals and commands, with external apparatuses connected wirelessly or cable. The communication unit 54 is connectable to a wireless local area network (LAN) and internet. The communication unit 54 is also communicable with an external apparatus via Bluetooth and Bluetooth Low Energy. The communication unit 54 can send an image (including an LV image) captured by the imaging unit 22, and an image recorded in a recording medium (storage medium) 185, and can receive image data and various other information from an external apparatus.

An attitude detection unit 55 detects an attitude of the camera 100 with respect to the gravity direction. Based on the attitude detected by the attitude detection unit 55, it can be determined whether the image captured by the imaging unit 22 is an image captured by the camera 100 held horizontally, or an image captured by the camera 100 held vertically. The system control unit 50 can attach the orientation information, in accordance with the attitude detected by the attitude detection unit 55, to an image file of an image captured by the imaging unit 22, or can rotate an image thereby. For the attitude detection unit 55, an acceleration sensor, a gyro sensor, or the like can be used. The acceleration sensor or the gyro sensor used for the attitude detection unit 55 can also detect the movement (e.g. pan, tilt, lift, remain still) of the camera 100.

An extra-finder display unit 43 displays various set values of the camera, including shutter speed and aperture, via an extra-finder display unit driving circuit 44.

A power supply control unit 80 is constituted of a battery detection circuit, a DC-DC convertor, a switch circuit to select a block to be energized, and the like, and detects whether or not a battery is installed, a type of battery, a residual amount of battery, and the like. The power supply control unit 80 also controls the DC-DC convertor based on this detection result and on instructions from the system control unit 50, and supplies the required voltage to each portion, including a recording medium 185, for a required time. A power supply unit 30 is constituted of a primary battery (e.g. alkali battery, lithium battery), a second battery (e.g. NiCd battery, NiMH battery, Li battery) and AC adapter.

A recording medium I/F 18 is an interface with the recording medium 185 (e.g. memory card, hard disk). The recording medium 185 is such a recording medium as a memory card for recording a captured image, and is constituted of a semiconductor memory, a magnetic disk, or the like.

An operation unit 70 is an input unit to receive an operation from the user (user operation), and is used to input various operation instructions to the system control unit 50. As illustrated in FIG. 2, the operation unit 70 includes a shutter button 61, a mode selection switch 60, a power supply switch 72, a touch panel 70a, and other operation members 70b. As the other operation members 70b, the operation unit 70 includes, for example, a main electronic dial 71, a sub-electronic dial 73, a four-direction key 74, a SET button 75, a video button 76, an AE lock button 77, a magnifying button 78, a reproduction button 79, a menu button 81, and the like.

The shutter button 61 includes a first shutter switch 62 and a second shutter switch 64. The first shutter switch 62 turns ON in mid-operation of the shutter button 61, that is, in the half-depressed state (image capturing preparation instruction), and generates a first shutter switch signal SW1. When the first shutter switch signal SW1 is generated, the system control unit 50 starts the image capturing preparation operation including the AF processing, the AE processing, the AWB processing, the FE processing, and the like.

The second shutter switch 64 turns ON when operation of the shutter button 61 is completed, that is, in the fully depressed state (image capturing instruction), and generates a second shutter switch signal SW2. When the second shutter switch signal SW2 is generated, the system control unit 50 starts a series of image capturing processing, from a step of reading signals from the imaging unit 22, to a step of writing the captured image in the recording medium 185 as image data.

The mode selection switch 60 switches the operation mode of the system control unit 50 to one of: a still image capturing mode, a moving image capturing mode, a reproduction mode, or the like. The still image capturing mode includes, for example: an auto image capturing mode, an auto scene determining mode, a manual mode, an aperture priority mode (Av mode), a shutter speed priority mode (Tv mode), and a program AE mode (P mode). The still image capturing mode includes various scene modes in which image capturing settings are performed depending on the image capturing scene, and custom modes. Using the mode selection switch 60, the user can directly switch the operation mode to one of these modes. The user may select an image capturing mode list screen first using the mode selection switch 60, then select one of a plurality of modes displayed thereon using another operation member. In the same manner, the moving image capturing mode may include a plurality of modes.

The touch panel 70a is a touch sensor that detects various touch operations on the display surface of the display unit 28 (operation surface of the touch panel 70a). The touch panel 70a may be configured integrated with the display unit 28. For example, the touch panel 70a is configured such that the transmittance of light thereof does not interrupt display of the display unit 28, and is installed on the upper layer of the display surface of the display unit 28. Then the input coordinates on the touch panel 70a are associated with the display coordinates on the display surface of the display unit 28. Thereby a graphical user interface (GUI), as if the user could directly operate the screen displayed on the display unit 28, can be provided.

Figure 3:
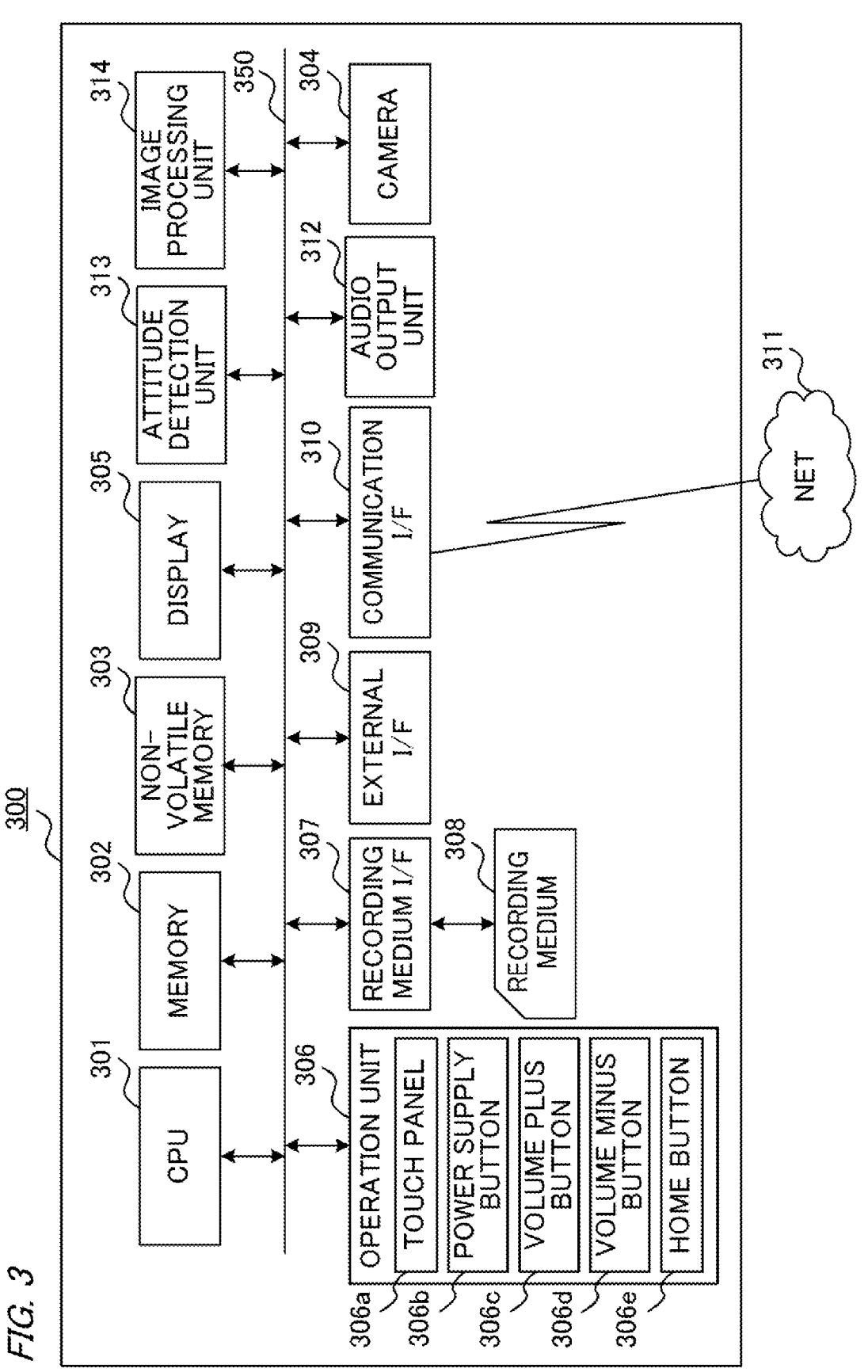
FIG. 3 is a block diagram depicting a configuration example of an information processing apparatus according to Embodiment 1.

FIG. 3 is a block diagram depicting a configuration example of a smartphone 300, which is used as the information processing apparatus according to Embodiment 1. The smartphone 300 includes: a CPU 301, a memory 302, a non-volatile memory 303, a camera 304, a display 305, an operation unit 306, a recording medium I/F 307, a recording medium 308, an external I/F 309, and a communication I/F 310. The smartphone 300 also includes an audio output unit 312, an attitude detection unit 313, and an image processing unit 314. Each unit of the smartphone 300 is connected to an internal bus 350, and can exchange data with each other via the internal bus 350.

The CPU 301 is a control unit to control the smartphone 300 in general, and includes at least one processor or circuit.

The memory 302 is a volatile memory using such a semiconductor element as RAM, for example. The CPU 301 develops a program stored in the non-volatile memory 303 in the memory 302, for example, and controls each unit of the smartphone 300 using the memory 302 as a work memory. The non-volatile memory 303 stores image data, audio data, other data, various programs for the CPU 301 to operate, and the like. The non-volatile memory 303 is a flash memory, a read-only memory (ROM) or the like, for example.

Based on the control of the CPU 301, the image processing unit 314 performs various image processing and subject recognition processing on an image captured by the camera 304. The image processing unit 314 can also perform various image processing and subject recognition processing on an image stored in the non-volatile memory 303 or in the recording medium 308, an image acquired via the external I/F 309, an image acquired via the communication I/F 310, or the like.

Based on the control of the CPU 301, the display 305 displays a GUI screen including an image and GUI, for example. According to a program, the CPU 301 generates a display control signal and controls each unit of the smartphone 300, so as to generate an image signal to display the image on the display 305, and output the image signal to the display 305. The display 305 displays the image based on the outputted image signal. The smartphone 300 may include an interface to output an image signal for the display 305 to display the image, and the display 305 may be an external monitor (TV).

The operation unit 306 is an input device to receive user operation. The operation unit 306 includes a text information input device (e.g. keyboard), a pointing device (e.g. mouse, touch panel), and other operation members (e.g. buttons, dial, joy stick, touch sensor, touch pad). In the example in FIG. 3, the operation unit 306 includes: a touch panel 306a, a power supply button 306b, a volume plus button 306c, a volume minus button 306d, and a home button 306e.

The recording medium I/F 307 is an interface to install the recording medium 308, such as a memory card, CD and DVD. The CPU 301 can read data from the installed recording medium 308, and write data to the recording medium 308 via the recording medium I/F 307. The recording medium 308 may be an internal storage included in the smartphone 300.

The external I/F 309 is an interface to connect to an external apparatus wirelessly or via cable, so as to input/output an image signal and an audio signal. The communication I/F 310 is an interface to communicate with an external apparatus, internet 311 or the like, so as to transmit/receive various data, such as files and commands.

The audio output unit 312 outputs sound of a moving image, sound of audio data, an operation tone, a ring tone, and various notification tones. The attitude detection unit 313 detects an attitude (inclination) of the smartphone 300 with respect to the gravity direction, and an attitude (inclination) of the smartphone 300 with respect to each axis of yaw, roll and pitch. Based on the attitude detected by the attitude detection unit 313, it can be determined whether the smartphone 300 is held horizontally, vertically, facing up, facing down, or held in a diagonal attitude. For the attitude detection unit 313, any one of such sensors as an acceleration sensor, a gyro sensor, a geo magnetic sensor, an azimuth sensor, and an altitude sensor can be used. For the attitude detection unit 113, a combination of two or more sensors, out of the above mentioned sensors, may be used.

The touch panel 306a is configured on a plane so as to be superimposed on the display 305, and can output coordinate information in accordance with the touched position. The touch panel 306a to be used may be any one of various types of touch panels, such as a resistive film type, an electrostatic capacitive type, a surface acoustic wave type, an infrared type, an electromagnetic induction type, an image recognition type, and a photosensor type. Some types of touch panels 306a detect touch when the touch panel is actually contacted, while other types detect touch when a finger or pen approaches the touch panel, but the touch panel 306a may be either type.

Figure 4A:
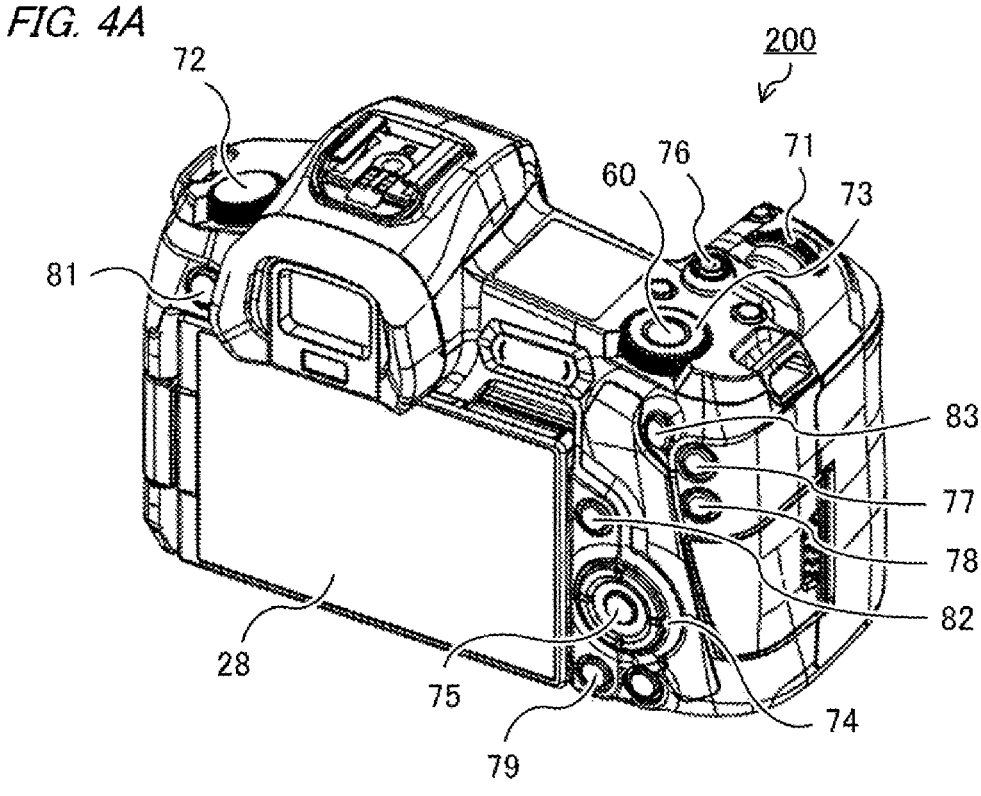
FIGS. 4A and 4B are diagrams exemplifying the arrangement of operation members of the cameras.
Figure 4B:
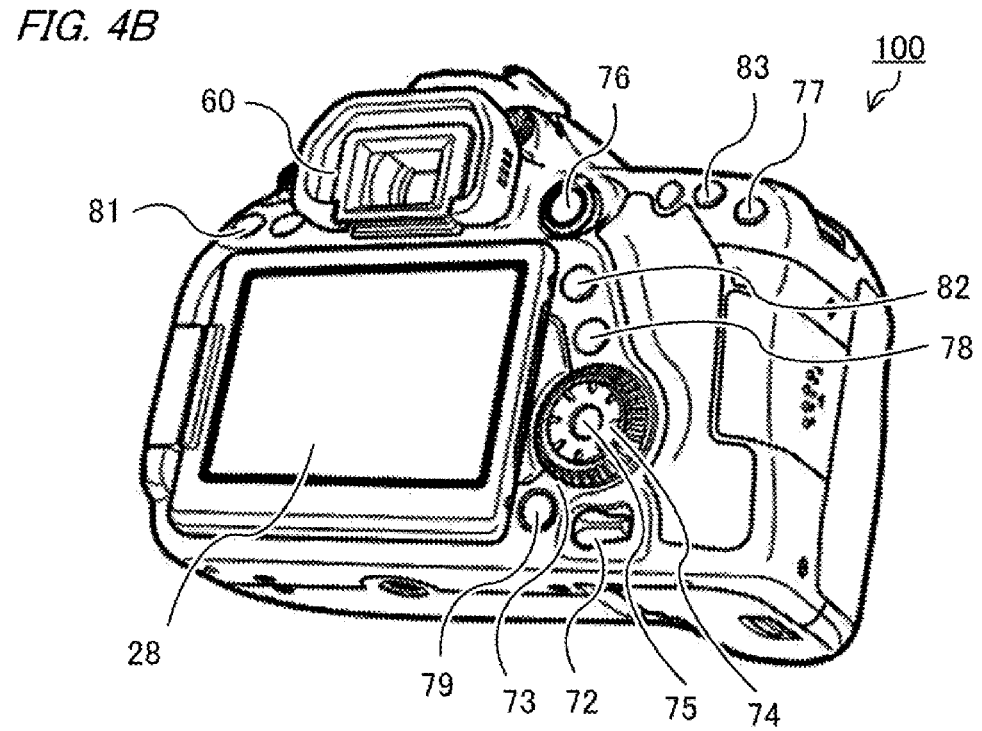

FIGS. 4A and 4B are diagrams exemplifying the arrangement of operation members of the camera 200, which is a transfer source of the setting information, and the camera 100, which is a transfer destination of the setting information. FIG. 4A is an external view of the camera 200 at the transfer source, and indicates the arrangement of the operation members of the camera 200. FIG. 4B is an external view of the camera 100 at the transfer destination, and indicates the arrangement of the operation members of the camera 100. In the camera 100 and the cameras 200, same operation members are denoted with a same reference sign.

The mode selection switch 60 is an operation member to switch various modes. The main electronic dial 71 is a rotating type operation member to change the set values of the shutter speed, the aperture, and the like. The power supply switch 72 is an operation member to switch the power supply of the camera 100 ON/OFF. The sub-electronic dial 73 is a rotating type operation member to move the selection frame (cursor), switch images, and the like, for example.

The four-direction key 74 is an operation member of which upper, lower, left and right portions can be pressed respectively. The user can perform operation corresponding to the pressed portion of the four-direction key 74. The SET button 75 is an operation member that is mainly pressed to determine a selected item. The video button 76 is an operation member to instruct the start/stop of video capturing (recording).

The AE lock button 77 is an operation member to be pressed to fix the exposure state in the image capturing standby state. The magnifying button 78 is an operation member to switch the magnifying mode ON/OFF in the live view display (LV display) of the image capturing mode. If the magnifying mode is ON, the live view image (LV image) is magnified or demagnified by operating the main electronic dial 71. The magnifying button 78 is used to magnify a reproduced image or to increase the magnification ratio in the reproduction mode.

The reproduction button 79 is an operation member to switch the image capturing mode and the reproduction mode. If the user presses the reproduction button 79 in the image capturing mode, the reproduction mode starts where the latest image, out of the images recorded in the recording medium 185, can be displayed on the display unit 28.

The menu button 81 is an operation member which is pressed to display the menu screen on the display unit 28, on which various settings can be performed. The user can intuitively perform various settings using the menu screen displayed on the display unit 28, the four-direction key 74 and the SET button 75.

An INFO button 82 is an operation member which is pressed to switch information displayed on the display unit 28. An AF-ON button 83 is an operation member which is pressed to perform AF pressing on the subject in the image capturing standby state.

FIGS. 5A and 5B are tables exemplifying the arrangement information of operation members of the camera 200, which is the transfer source of the setting information, and of operation members of the camera 100, which is the transfer destination of the setting information. FIG. 5A indicates the operation member arrangement information of the camera 200 at the transfer source, and FIG. 5B indicates the operation member arrangement information of the camera 100 at the transfer destination.

The operation member arrangement information includes, for example, information on a surface (e.g. rear surface, top surface) of the camera where each operation member is disposed, and information on an angle and distance from a reference operation member disposed on this surface. For example, in the example of FIG. 5A, the AE lock button 77 of the camera 200 at the transfer source is disposed on the rear surface of the camera 200 in a 90° direction from the AF-ON button 83 (reference operation member), and at the 0.7 cm position from the AF-ON button 83. In the example of FIG. 5B, the AE lock button 77 of the camera 100 at the transfer destination is disposed on the rear surface of the camera 100 in an 80° direction from the AF-ON button 83 (reference operation member), and at the 0.7 cm position from the AF-ON button 83. The angle from the AF-ON button 83 may be expressed by an angle from a reference (0°), that is, the direction vertical from the top surface of the camera 100 or the camera 200, for example.

The operation member arrangement information is not limited to the information indicated in FIGS. 5A and 5B, and may be any information that can specify a position of each operation member. For example, the operation member arrangement information may be information on the angle and distance of the operation member with respect to the center or a corner of the surface of the camera on which the operation member is disposed.

FIGS. 6A to 6C are tables exemplifying the setting information of the operation members of the camera 200, which is the transfer source of the setting information, and of the camera 100, which is the transfer destination of the setting information. FIG. 6A indicates the setting information of the operation members of the camera 200 at the transfer source. FIG. 6B indicates the setting information of the operation members of the camera 100 at the transfer destination. The setting information of the operation members include: an operation member name, assignment function which the user assigned to the operation member as the setting for the operation member, and a use count of the operation member.

FIG. 6C is a table exemplifying settable information of the camera 100 at the transfer destination. Specifically, the settable information includes the operation member name and information on functions that can be assigned to the operation member. For example, either the "magnified display" or "display information change" function can be assigned to the magnifying button 78.

In FIGS. 6A to 6C, the operation member name may be an ID to identify the operation member. Here in this description, it is assumed that the setting for each operation member is a function assigned to the operation member, but the setting is not limited to the function, but may include information on various settings for the operation member.

The information indicated n FIG. 6A corresponds to "first information". The "first information" may include the operation member arrangement information of the camera 200 indicated in FIG. 5A. The information indicated in FIGS. 6B and 6C correspond to "second information". The "second"

information" may include the operation member arrangement information of the camera 100 indicated in FIG. 5B.

The use count of operation members indicated in FIGS. 6A and 6B may be a number of times added up during a predetermined period. The use count of an operation member is not limited to a number of times added up for each operation member, but may be a number of times added up for each combination of an operation member and setting for this operation member. In other words, the use count of an operation member may be added up for each combination of an operation member and a function assigned to this operation member. Furthermore, the use count of an operation member may be added up for each user.

The user frequency of an operation member may be initialized by user operation. Furthermore, the user frequency of an operation member may be initialized in a case where the setting for an operation member (e.g. assigned function) is changed.

Figure 7:
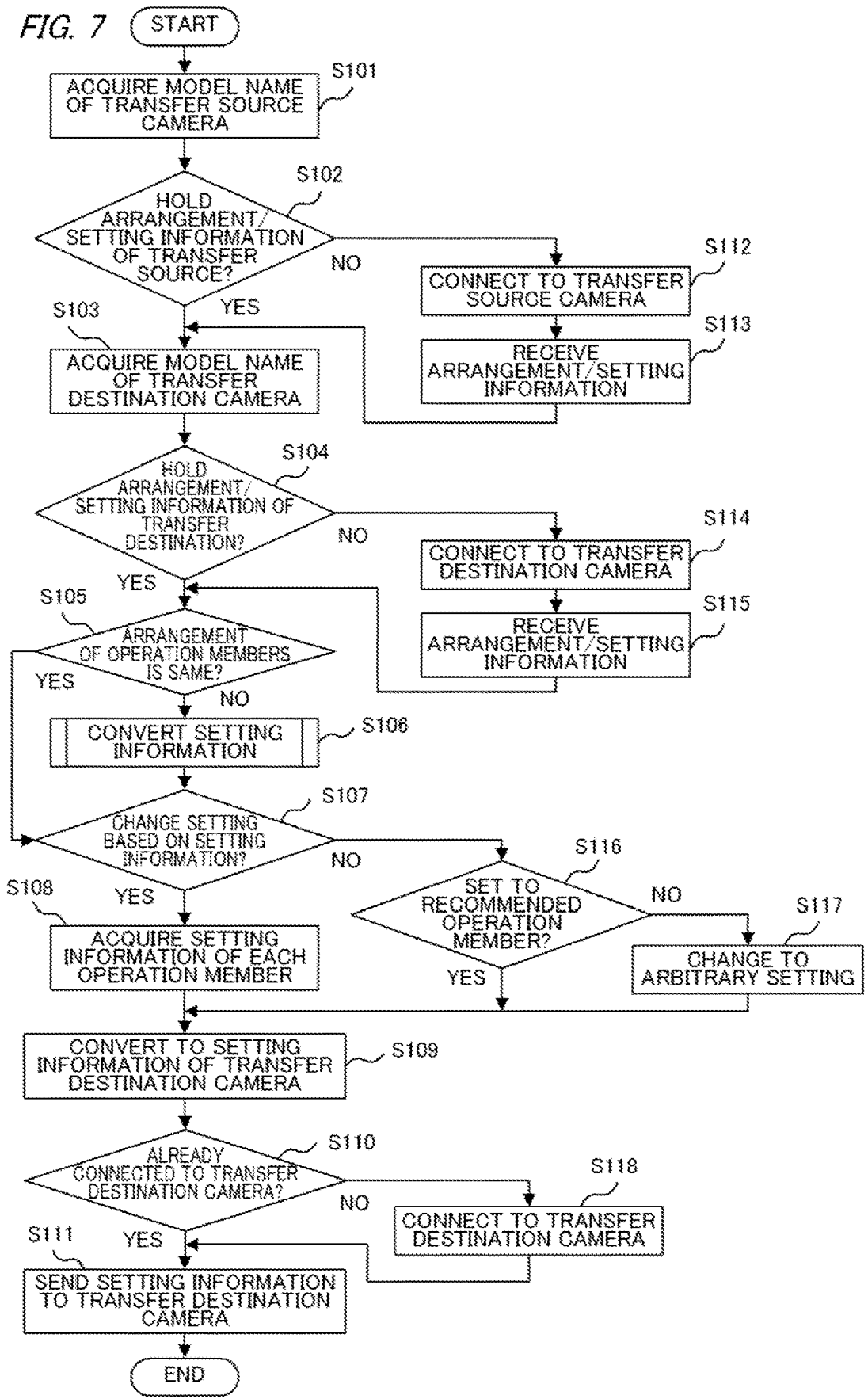
FIG. 7 is a flow chart exemplifying conversion processing of the setting information.

FIG. 7 is a flow chart exemplifying conversion processing of setting information. The smartphone 300 converts the setting information for an operation member of the camera 200 at the transfer source into the setting information for an operation member of the camera 100 at the transfer destination. Specifically, the CPU 301 of the smartphone 300 determines an operation member of the camera 100 to which setting for each operation member of the camera 200 is applied respectively.

In step S101, the CPU 301 acquires a model name of the camera 200 at the transfer source. The CPU 301 can, for example, acquire a model name inputted by the user from the operation unit 306 (e.g. touch panel 306a). The CPU 301 may also acquire (receive) a model name by connecting to the camera 200 at the transfer source via the communication I/F 310. The CPU 301 may acquire information by which a model can be specified, such as a model number, instead of a model name.

In step S102, the CPU 301 determines whether the smartphone 300 holds the arrangement information and the setting information for the operation members of the camera 200 at the transfer source. For this, the CPU 301 may determine whether the arrangement information and the setting information for the operation members of the camera 200 are stored in a storage unit of the smartphone 300, such as the memory 302, the non-volatile memory 303, or the recording medium 308. The setting information of the operation members of the camera 200 includes information on the function assigned to each operation member and use count thereof, as exemplified in FIG. 6A. If the smartphone 300 holds the arrangement information and the setting information for the operation members, processing advances to step S103. If the smartphone 300 does not hold the arrangement information and the setting information for the operation members, processing advances to step S112.

In step S112, the CPU 301 connects to the camera 200 at the transfer source via the communication I/F 310. The connection to the camera 200 may be connection via cable or wireless.

In step S113, the CPU 301 receives the arrangement information and the setting information for the operation members from the camera 200 at the transfer source via the communication I/F 310. The setting information includes information on the use count of the operation members. In the case where the arrangement information of the operation members of the camera 200 are already held, for example, the CPU 301 may receive only the setting information. The CPU 301 stores the information received from the camera

200 in a storage unit, such as the memory 302, the non-volatile memory 303 or the recording medium 308.

In step S103, the CPU 301 acquires a model name of the camera 100 at the transfer destination, just like step S101. In step S104, the CPU 301 determines whether the smartphone 300 holds the arrangement information and the setting information for the operation members of the camera 100 at the transfer destination. For this, the CPU 301 may determine whether the arrangement information and the setting information for the operation members of the camera 100 are stored in a storage unit, such as the memory 302, the non-volatile memory 303 or the recording medium 308.

The setting information for the operation members of the camera 100 includes information on use count and assignable function of each operation member as exemplified in FIG. 6B. Further, the setting information for the operation members of the camera 100 includes information on the assignable function to each operation member as exemplified in FIG. 6C. If the smartphone 300 holds the arrangement information and the setting information for the operation members, processing advances to S105. If the smartphone 300 does not hold the arrangement information and the setting information, processing advances to step S114.

In step S114, the CPU 301 connects to the camera 100 at the transfer destination via the communication I/F 310. The connection to the camera 100 may be connection via cable or wireless.

In step S115, the CPU 301 receives the arrangement information and the setting information for the operation members from the camera 100 at the transfer destination via the communication I/F 310. The setting information includes information on the use count of each operation member, and information on assignable function to each operation member. The CPU 301 stores the information received from the camera 100 in a storage unit, such as the memory 302, the non-volatile memory 303 or the recording medium 308.

In step S105, the CPU 301 determines whether the arrangement of the operation members of the camera 200 at the transfer source and the arrangement of the operation members of the camera 100 at the transfer destination are the same. The CPU 301 can determine that these arrangements are the same if the arrangement information for each operation member of the camera 200 at the transfer source and the arrangement information of the corresponding operation member of the camera 100 at the transfer destination are approximately the same. In other words, the CPU 301 determines that these arrangements are the same with respect to an operation member, which is a setting applying target, in the case where the arrangement of an operation member of the camera 200 at the transfer source, and the arrangement of corresponding operation member of the camera 100 at the transfer destination are approximately the same. If the arrangement of the operation members are the same, the setting information for the operation member of the camera 200 at the transfer source is used as the setting information for the operation members of the camera 100 at the transfer destination. Processing advances to S107 if the arrangements of the operation members are the same, and processing advances to S106 if the arrangements of the operation members are not the same.

In step S106, using the arrangement information and setting information for the operation members, the CPU 301 converts the setting information of the camera 200 at the transfer source into the setting information of the camera 100 at the transfer destination. Specifically, the CPU 301 determines an operation member of the camera 100 at the transfer destination to which the setting for each operation member of the camera 200 at the transfer source is applied, using such information as the use count. The converted setting information of the camera 100 at the transfer destination includes information on the function assigned to each operation member of the camera 100 respectively. The processing in step S106 will be described later in detail with reference to FIG. 9. If it is determined that the arrangements information of the operation members approximately match in step S105, the setting information of the camera 200 at the transfer source is not converted, and is set as the setting information of the camera 100 at the transfer destination. Therefore the setting information of the camera 200 at the transfer source is set to the operation members disposed in the same arrangement in the camera 100 at the transfer destination.

In step S107, the CPU 301 inquires to the user and determines whether the setting of the operation members of the camera 100 is changed based on the setting information. The CPU 301 displays on the display 305 the function assigned to each operation member of the camera 100 at the transfer destination, and inquires to the user if this displayed setting is used.

The CPU 301 may inquire whether or not the setting is changed for each operation member at the transfer destination, or may display a list of the setting information on a plurality of operation members on the display 305 first, then inquire whether or not the setting is changed for each operation member. For example, in a case where an operation member name at the transfer source and an operation member name at the transfer destination are different, or in a case where there are a plurality of operation members at the transfer destination to which a setting (function) of an operation member at the transfer source can be transferred, the CPU 301 inquires to the user whether or not the setting is changed. If there are a predetermined number (e.g. 3) or more operation members to be the target of this inquiry, the CPU 301 may advances to step S117, without performing this inquiry to the user.

The user inputs whether the setting displayed on the display 305 is used or not via the operation unit 306, such as the touch panel 306*a*. Receiving the operation from the user, the CPU 301 can determine whether the setting of the operation member at the transfer destination is changed to the setting displayed on the display 305. If the setting of the operation member at the transfer destination is changed based on the presented setting information, processing advances to step S108. If the setting of the operation member is not changed to the presented setting of the setting information, processing advances to step S116.

In step S116, the CPU 301 determines whether the function assigned to an operation member at the transfer source is set for a recommended operation member of the camera 100. The candidates of the recommended operation members are the operation members of the camera 100 at the transfer destination, to which the function assigned to the operation member at the transfer source can be set (applied). The candidates of the recommended operation members which are displayed may be the operation members at the transfer destination, to which the function of the operation members at the transfer source can be assigned, excluding the operation member at the transfer destination presented in step S107. The CPU 301 displays on the display 305 the operation members of the camera 100 at the transfer destination, to which the function assigned to the operation member at the transfer source can be applied, and inquires to the user which operation member is selected.

Figure 8A:
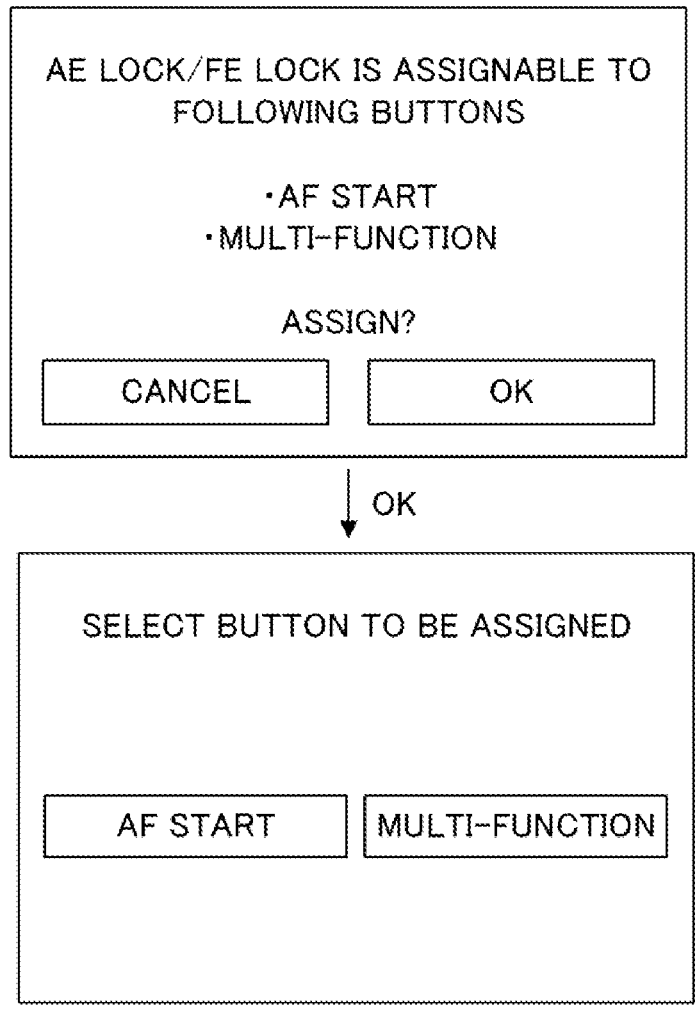
FIGS. 8A and 8B are diagrams indicating examples of function assignment screens for the operation members.

FIG. 8A is an example of the function assignment screen for the operation members, and indicates an example of an inquiry screen to the user, which is displayed on the display 305 in step S116. In the example in FIG. 8A, the CPU 301 displays "AF start" and "Multi-function" as the candidates of the operation member to which the AE lock/FE lock function can be assigned. The CPU 301 inquires to the user whether the AE lock/FE lock function is assigned to one of the candidates. If the "OK" button is pressed (touched), the CPU 301 further displays a screen to inquire to the user whether the AE lock/FE lock function is assigned to the candidate "AF Start" or to the candidate "Multi-function". Input from the user can be received from the operation unit 306, such as the touch panel 306*a*.

If the user selects "AF Start" or "Multi-function" as the operation member to which the AE lock/FE lock function is assigned, processing advances to step S109. If the user presses (touches) the "Cancel" button in the initial screen in FIG. 8A, or if no operation member is selected on the screen which is displayed when the "OK" button is pressed, processing advances to S117.

FIG. 8A is an example of causing the user to select an operation member of the camera 100 at the transfer destination for one function, but the present invention is not limited to selection for one function. In step S116, the CPU 301 may cause the user to select operation members of the camera 100 to which a plurality of functions are assigned respectively.

In step S117, the CPU 301 changes the setting to an arbitrary setting specified by the user. The CPU 301 displays on the display 305 a customize screen, where the user arbitrarily sets a function assignment for an operation member to which the function of the camera 100 can be assigned.

Figure 8B:
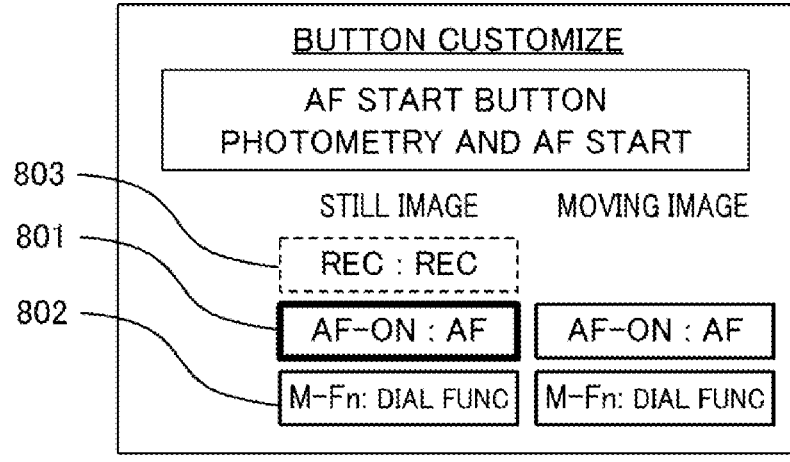

FIG. 8B is an example of the function assignment screen for the operation members, and indicates an example of a customize screen where the user arbitrarily sets a function assignment for each operation member in step S117. In the still image capturing, the user can change the function assignment to an "REC" button, an "AF-ON (AF Start)" button, and an "M-Fn" button. FIG. 8B indicates that the photometry and AF Start function is assigned to the "AF-ON" button, and an item 801, to change the function assignment for the "AF-ON" button, is highlighted. If the user presses (touches) the item 801, the screen changes to the function assignment screen for the "AF-ON" button, where the user can change the function assigned to the "AF-ON" button.

On the customize screen in FIG. 8B, the CPU 301 may highlight the item 801, the item 802 and the like, corresponding to an operation member to which the photometry and AF Start function can be assigned. The item 803, corresponding to the "REC" button, to which the function of the photometry and AF Start function cannot be assigned, is displayed in a less noticeable manner than the item 801 and the item 802.

In step S108, the CPU 301 acquires the setting information that is assigned to each operation member of the camera 100 at the transfer destination. The setting information acquired here is the setting information converted in step S106. If the setting information of the camera 200 at the transfer source and the arrangement information of the camera 100 at the transfer destination are the same in step S105, then the CPU 301 may acquire the setting information of the camera 200 at the transfer source as the setting information to be assigned to each operation member of the camera 100 at the transfer destination.

In step S109, the CPU 301 converts the setting information that is assigned to each operation member of the camera 100 at the transfer destination into a format corresponding to the camera 100 at the transfer destination. If the setting information applied to each operation member of the camera 100 at the transfer destination is in the format corresponding to the camera 100, the processing in step S109 need not be executed.

In step S110, the CPU 301 determines whether the smartphone 300 is already connected to the camera 100 at the transfer destination. If the smartphone 300 is already connected to the camera 100 at the transfer destination, processing advances to step S111. If the smartphone 300 is not connected to the camera 100 at the transfer destination, processing advances to step S118. In step S118, the CPU 301 connects to the camera 100 at the transfer destination via the communication I/F 310, just like step S114. In step S111, the CPU 301 sends the setting information to the camera 100 at the transfer destination via the communication I/F 310.

Figure 9:
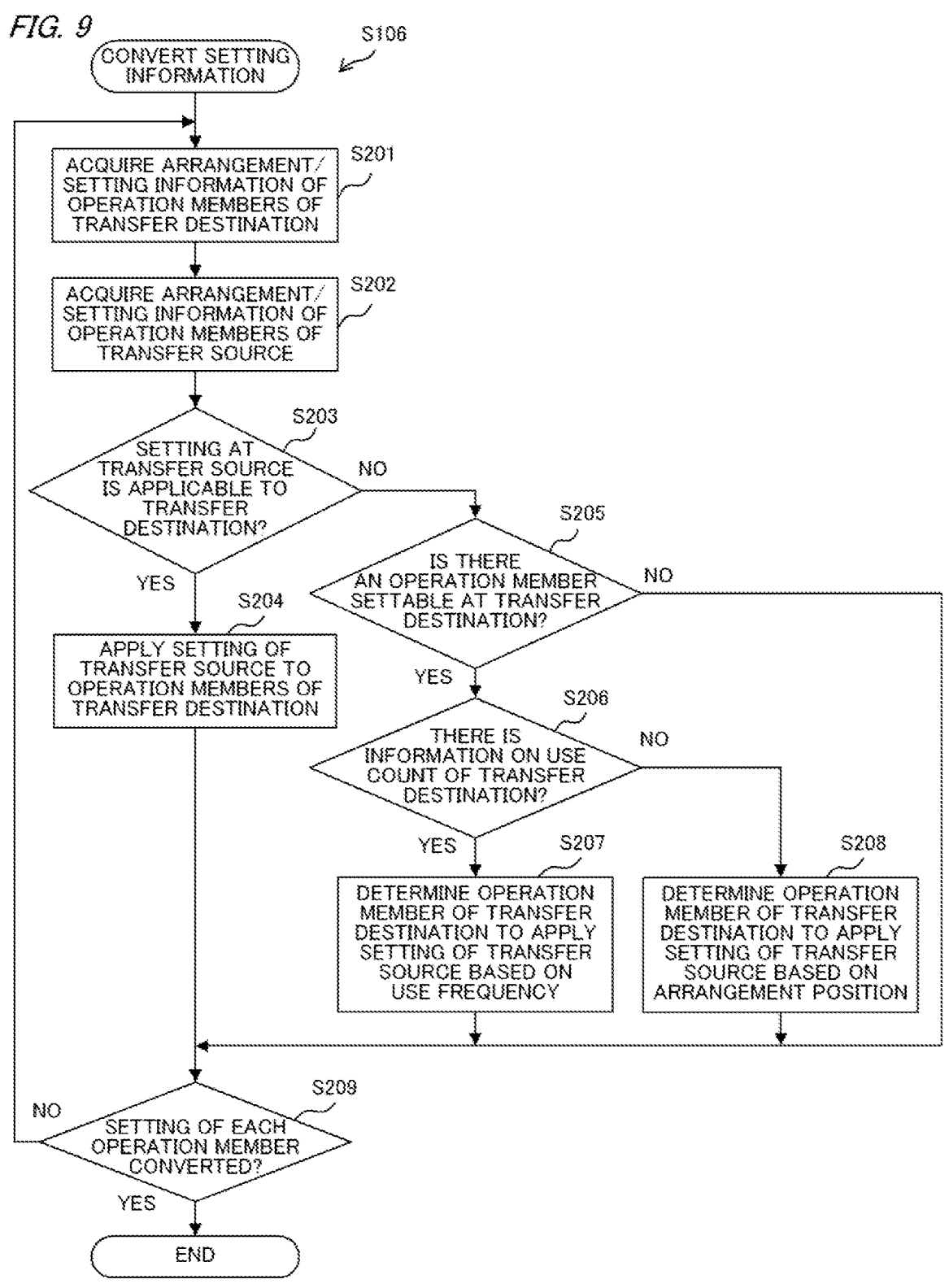
FIG. 9 is a flow chart exemplifying details of the conversion processing of the setting information.

FIG. 9 is a flow chart exemplifying details of the conversion processing of setting information. The processing indicated in FIG. 9 is specific processing of the setting information conversion processing in step S106 in FIG. 7. The CPU 301 determines an operation member (second operation member) of the camera 100 at the transfer destination to which setting for an operation member (first operation member) of the transfer source is applied.

In step S201, the CPU 301 acquires the arrangement information and the setting information for the operation members of the camera 100 at the transfer destination. The CPU 301 acquires the arrangement information and the setting information for the operation members by reading from s storage unit of the smartphone 300, such as the memory 302, the non-volatile memory 303, or the recording medium 308.

In step S202, the CPU 301 acquires the arrangement information and the setting information for the operation members of the camera 200 at the transfer source by reading from a storage unit of the smartphone 300 in the same manner as step S201. Step S201 and step S202 may be executed in reversed sequence, or may be executed in parallel.

In step S203, the CPU 301 determines whether the setting of each operation member at the transfer source is applicable to a corresponding operation member of the camera 100 at the transfer destination. The CPU 301 can acquire information on the applicable setting (assignable function) for each operation member of the camera 100 at the transfer destination, from a storage unit of the smartphone 300, such as the memory 302, the non-volatile memory 303, or the recording medium 308. The CPU 301 may also acquire the information on the applicable setting for each operation member of the camera 100 at the transfer destination from the camera 100.

If the setting for an operation member of the transfer source is settable for the corresponding operation member of the camera 100 at the transfer destination, processing advances to step S204. If the setting for an operation member of the transfer source is not settable for the corresponding operation member of the camera 100 at the transfer destination, processing advances to step S205.

In step S204, the CPU 301 sets the setting for the operation member at the transfer source for the corresponding operation member of the camera 100 at the transfer destination. Specifically, the CPU 301 assigns the function assigned to the operation member at the transfer source to the corresponding operation member of the camera 100 at the transfer destination.

In step S205, the CPU 301 determines whether there is an operation member, among the operation members of the camera 100 at the transfer destination, to which the setting for the operation member at the transfer source is applicable. If it is determined that there is an operation member of the camera 100 to which the setting for the operation member at the transfer source is applicable, processing advances to step S206. If there is no operation member of the camera 100 to which the setting for the operation member at the transfer source is applicable, processing advances to step S209.

In step S206, the CPU 301 determines whether the setting information of the camera 100 at the transfer destination acquired in step S201 includes information on the use count of each operation member. If the setting information of the camera 100 includes the information on the use count of each operation member, processing advances to step S207. If the setting information of the camera 100 does not include the information on the use count of each operation member, processing advances to step S208.

In step S207, among the operation members of the camera 100 at the transfer destination to which the setting for the corresponding operation members at the transfer source is applicable, the CPU 301 determines an operation member at the transfer destination to which the setting for the corresponding operation member at the transfer source is applied, based on the use frequency. Specifically, among the operation members of the camera 100 at the transfer destination, the CPU 301 determines, as the operation member at the transfer destination, an operation member of which use frequency is closest to the use frequency of the operation member at the transfer source. For example, the use frequency can be a ratio of the use count of each operation member with respect to the total use count of the operation members of the camera.

Thus the operation member of the camera 100, to which the setting of the operation members at the transfer source is applied, can be an operation member of which an index based on the use count, such as the use frequency, is closest to that of the operation member at the transfer source. The index based on the use count is not limited to the use frequency, but may be a ranking of the use count among operation members of the camera.

In step S208, among the operation members of the camera 100 at the transfer destination to which the setting of the operation member at the transfer source is applicable, the CPU 301 determines an operation member at the transfer destination to which the setting of the operation member at the transfer source is applied, based on the arrangement position of the operation member. Specifically, among the operation members of the camera 100 at the transfer destination, the CPU 301 determines, as the operation member at the transfer destination, an operation member of which relative position with respect to the reference operation member is closest to the relative position of the operation member at the transfer source with respect to the reference operation member of the camera 200 at the transfer source.

In step S209, the CPU 301 determines whether the setting information of each operation member has been converted. For example, for each operation member of the camera 100 at the transfer destination, the CPU 301 checks whether an operation member of the camera 200 at the transfer source, of which setting information is transferred, has been determined. The CPU 301 may check whether an operation member of the camera 100 at the transfer destination, of which setting is transferred, has been determined, for each operation member of the camera 200 at the transfer source. If the setting information of each operation member has been converted, the processing indicated in FIG. 9 ends. If the setting information of each operation member has not been converted, the CPU 301 returns to step S201, and converts the setting information for each operation member for which setting information is not converted.

In Embodiment 1 described above, in the case of transferring the setting of the camera 200 at the transfer source to the camera 100 at the transfer destination, the smartphone 300 determines an operation member of the camera 100 to which the setting for each operation member of the camera 200 is applied, using an index based on the use count. Thereby even in the case of transferring setting information among the models of which the arrangement of the operation members and applicable functions are different, the smartphone 300 can transfer the setting information from the camera 200 at the transfer source to the camera 100 at the transfer destination, without diminishing operability of the user.

In the case where information on the use count does not exist, the smartphone 300 determines the operation member of the camera 100 to which the setting of each operation member of the camera 200 is applied, based on the arrangement information of the operation members of the camera 200 at the transfer source and the camera 100 at the transfer destination. Among the operation members of the camera 100 at the transfer destination, the smartphone 300 applies the setting of an operation member at the transfer source to an operation member, of which relative position with respect to the reference operation member is closest to the reference position of the operation member of the camera 200 at the transfer source, with respect to the reference operation member at the transfer source. Since the setting of an operation member at the transfer source is transferred to an operation member at a similar arrangement position, the user can operate the camera 100 at the transfer destination with the same usability.

Embodiment 2

In Embodiment 1, the setting information of the camera 200 at the transfer source is converted into the setting information of the camera 100 at the transfer destination using the smartphone 300. In Embodiment 2, on the other hand, a part of the processing by the smartphone 300 is executed by a cloud server 500. In Embodiment 2, FIGS. 2, 3, 4A, 4B, 5A, 5B, 6A to 6C, 8A, 8B and 9 are the same as Embodiment 1, hence detailed description thereof will be omitted. Therefore Embodiment 2 will be described with reference to FIGS. 7, 10 and 11.

Figure 10:
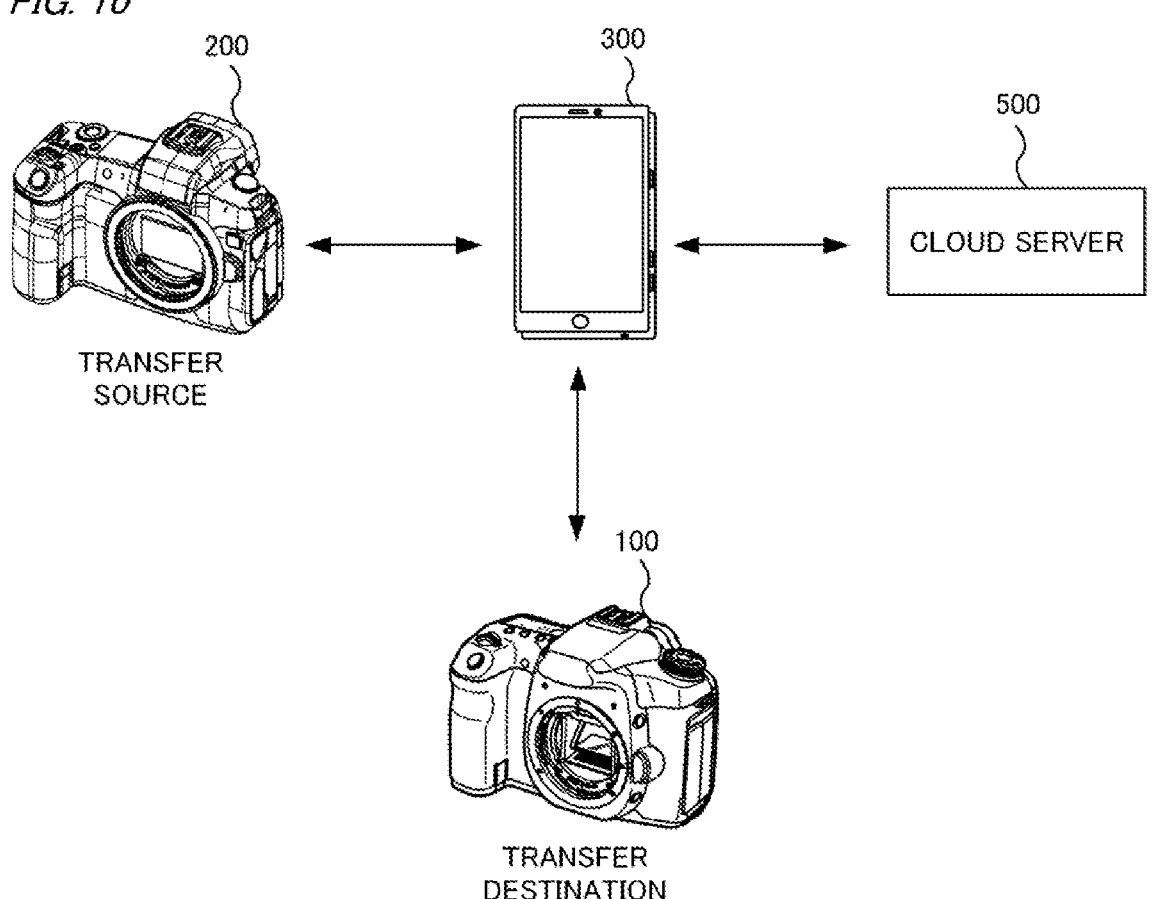
FIG. 10 is a diagram exemplifying a configuration of an information processing system of Embodiment 2.

FIG. 10 is a diagram exemplifying a configuration of an information processing system according to Embodiment 2. The information processing system is a system including the camera 100 and camera 200, which are electronic apparatuses, the smartphone 300, and the cloud server 500.

The camera 200 and the camera 100 are communicably connected to the smartphone 300 respectively. The smartphone 300 is communicably connected to the cloud server 500. These connections may cable connection using USB or LAN, for example, or may be a wireless connection using Wi-Fi, Bluetooth, or the like. For the communication protocol, PTP, HTTP, or the like may be used. The camera 100 and the camera 200 may be communicably connected directly to the cloud server 500 without using the smartphone 300.

Figure 11:
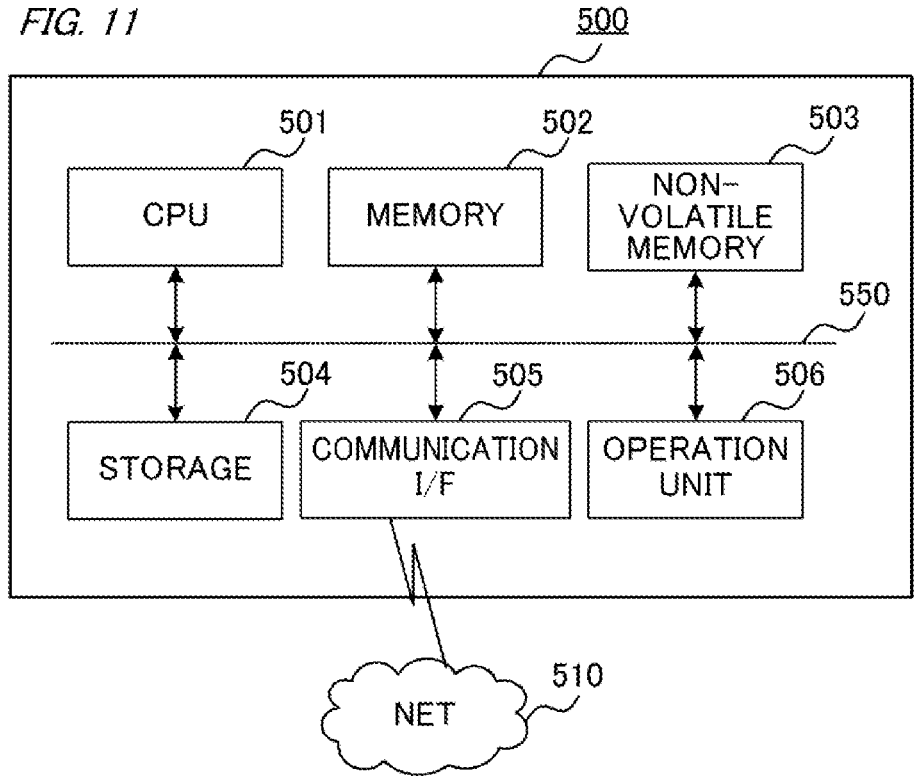
FIG. 11 is a block diagram depicting a configuration example of an information processing apparatus according to Embodiment 2.

FIG. 11 is a block diagram depicting a configuration example of the cloud server 500, which is the information processing apparatus according to Embodiment 2. The cloud server 500 includes: a CPU 501, a memory 502, a non-volatile memory 503, a storage 504, a communication I/F 505, and an operation unit 506. Each unit of the cloud server 500 is connected to an internal bus 550, and can exchange data with each other via the internal bus 550.

The CPU 501 is a control unit to control the cloud server 500 in general, and includes at least one processor or circuit. The memory 502 is a volatile memory using a semiconductor element, such as RAM, for example. The CPU 501 develops a program, stored in the non-volatile memory 503, in the memory 302, and controls each unit of the cloud server 500 using the memory 502 as a work memory. The non-volatile memory 503 stores various programs for the CPU 501 to operate. The non-volatile memory 503 is a flash memory, ROM, or the like, for example.

The storage 504 is a recording medium, such as a memory card, a hard disk, a CD and a DVD. The CPU 501 can read data from the storage 504, or write data to the storage 504. The storage 504 stores the arrangement information, the setting information and the like of the operation members of the camera 100 and the camera 200.

The communication I/F 505 is an interface to communicate with an external apparatus, Internet 510, or the like, and to transmit/receive various data, such as files and commands.

The operation unit 506 is an input device to receive user operation. The operation unit 506 includes a text information input device (e.g. keyboard), a pointing device (e.g. mouse, touch panel) and operation members (e.g. buttons, dial, joystick touch sensor, touch pad, power supply button). The cloud server 500 may accept an operation by commands which are received via the communication I/F 505, instead of accepting an operation via the operation unit 506.

Conversion processing of the setting information in Embodiment 2 will now be described with reference to FIG. 7. In Embodiment 2, the conversion processing of the setting information is mainly executed by the cloud server 500. It is assumed that the cloud server 500 holds the arrangement information for the operation members of various cameras in the storage 504. In the following, portions different from Embodiment 1 will be described, and detailed description on processing the same as Embodiment 1 will be omitted.

In step S101, the CPU 501 of the cloud server 500 acquires a model name of the camera 200 at the transfer source. The CPU 501 may receive the model name using commands or the like via the communication I/F 505, or may receive input of the model name from the operation unit 506.

In step S102, the CPU 501 determines whether the cloud server 500 holds the arrangement information and the setting information for the operation members of the camera 200 at the transfer source. The arrangement information for the operation members of the camera 200 is stored in the storage 504. The CPU 501 may determine whether the setting information for the operation members of the camera 200 is stored in a storage unit of the cloud server 500, such as the memory 502, the non-volatile memory 503, or the storage 504. If the cloud server 500 holds the setting information for the operation members, processing advances to S103. If the cloud server 500 does not hold the setting information for the operation members, processing advances to S112.

In step S112, the CPU 501 connects to the camera 200 at the transfer source via the communication I/F 505. The communication I/F 505 may be connected to the camera 200 via the smartphone 300, or may be directly connected to the camera 200 without using the smartphone 300. In step S113, the CPU 501 receives the setting information from the camera 200 at the transfer source via the communication I/F 505. The CPU 501 stores the information received from the camera 200 in a storage unit, such as the memory 502, the non-volatile memory 503, or the storage 504.

In step S103, the CPU 501 acquires a model name of the camera 100 at the transfer destination, just like step S101. In step S104, the CPU 501 determines whether the cloud server 500 holds the arrangement information and the setting information for the operation members of the camera 100 at the transfer destination. The arrangement information for the operation members of the camera 100 is stored in the storage 504. The CPU 501 may determine whether the setting information for the operation members of the camera 100 are stored in a storage unit, such as the memory 502, the non-volatile memory 503 or the storage 504.

The setting information for the operation members of the camera 100 includes information on the use count and assignable function to each operation member as exemplified in FIG. 6B. Further, the setting information for the operation members of the camera 100 includes information on the assignable function to each operation member as exemplified in FIG. 6C. If the cloud server 500 holds the setting information for the operation members, the CPU 501 acquires the arrangement information foe the operation members of the camera 100 from the storage 504, and processing advances to step S105. If the cloud server 500 does not hold the setting information for the operation members, processing advances to step S114.

In step S114, the CPU 501 connects to the camera 100 at the transfer destination via the communication I/F 505. The communication I/F 505 may be connected to the camera 100 via the smartphone 300, or may be directly connected to the camera 100 without using the smartphone 300.

In step S115, the CPU 501 receives the setting information for the operation members from the camera 100 at the transfer destination via the communication I/F 505. The setting information includes information on the use count of each operation member, and information on the assignable function to each operation member. The CPU 501 stores the information received from the camera 100 in a storage unit, such as the memory 502, the non-volatile memory 503, or the storage 504.

Processing in steps S105 to S109, S116 and S117 is the same as Embodiment 1. The processing of these steps, however, is executed based on the assumption that the CPU 301, the memory 302, the non-volatile memory 303 and the recording medium 308 were the CPU 501, the memory 502, the non-volatile memory 503 and the storage 504 respectively.

In steps S107, S108, S116 and S117, the display of the inquiry screen to the user and the reception of the operation from the user are executed by the smartphone 300, based on instructions from the cloud server 500. A part of the other processing in steps S107, S108, S116 and S117 may be executed by the CPU 301 of the smartphone 300.

In step S110, the CPU 501 determines whether the cloud server 500 has already been connected to the camera 100 at the transfer destination. The cloud server 500 may be connected to the camera 100 via the smartphone 300, or may be directly connected to the camera 100 without using the smartphone 300. If the cloud server 500 is already connected to the camera 100 at the transfer destination, processing advances to S111. If the cloud server 500 is not connected to the camera 100 at the transfer destination, processing advances to step S118.

In step S118, the CPU 501 connects to the camera 100 at the transfer destination via the communication I/F 505. The communication I/F 505 may be connected to the camera 100 via the smartphone 300, or may be directly connected to the camera 100 without using the smartphone 300.

In step S111, the CPU 501 sends the setting information to the camera 100 at the transfer destination. Instead of sending the setting information to the camera 100, the CPU 501 may store the setting information in the storage 504, so that the camera 100 is connected to the cloud server 500 and acquires (receives) the setting information.

In Embodiment 2 described above, the conversion of the setting information, to transfer the settings of the camera 200 at the transfer source to the camera 100 at the transfer destination, is executed by the cloud server 500. This means that the processing load on the smartphone 300 is reduced. Further, the cloud server 500 holds the arrangement information for the operation members for various cameras in the storage 504, hence the conversion processing of the setting information can be executed without acquiring the arrangement information of the operation members from the camera 200 at the transfer source and the camera 100 at the transfer destination.

The cloud server 500 also determines an operation member of the camera 100 to which the setting of the operation member of the camera 200 at the transfer source is applied, using an index based on the use count, information on the arrangement positions of the operation members, and the like, just like Embodiment 1. By transferring the setting information using the index based on the use count and the information on the arrangement positions of the operation members, the cloud server 500 can transfer the setting information of the camera 200 at the transfer source to the camera 100 at the transfer destination, without diminishing operability of the user.

Embodiment 3

In Embodiment 1, the setting information of the camera 200 at the transfer source is converted into the setting information of the camera 100 at the transfer destination using the smartphone 300. In Embodiment 3, on the other hand, the setting information of the camera 200 at the transfer source is converted into the setting information of the camera 100 at the transfer destination, without using the smartphone 300. In Embodiment 3, FIGS. 2, 4A, 4B, 5A, 5B and 6A to 6C are the same as Embodiment 1. Embodiment 3 will be described with reference to FIGS. 9, 12 and 13.

Figure 12:
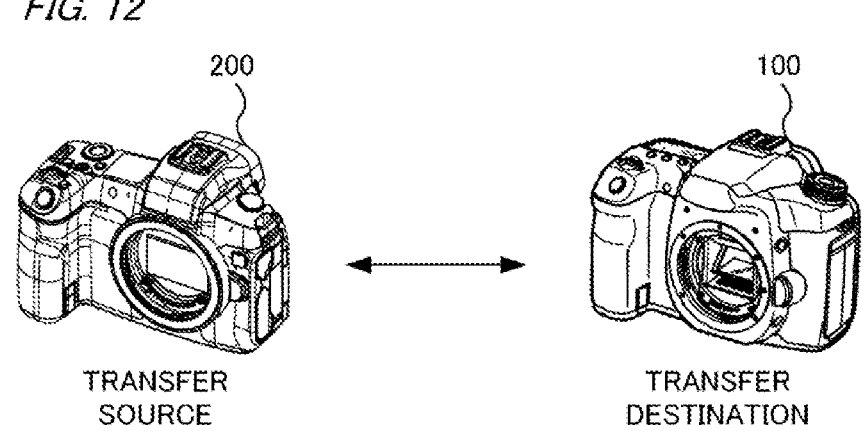
FIG. 12 is a diagram exemplifying a configuration of an information processing system of Embodiment 3.

FIG. 12 is a diagram exemplifying a configuration of an information processing system according to Embodiment 3. The information processing system is a system including the camera 100 and camera 200, which are electronic apparatuses. Connection between the camera 200 at the transfer source and the camera 100 at the transfer destination may be cable connection using USB, LAN, for the like, or may be wireless connection using Wi-Fi, Bluetooth, or the like. For the communication protocol, PTP, HTTP, or the like may be used.

Figure 13:
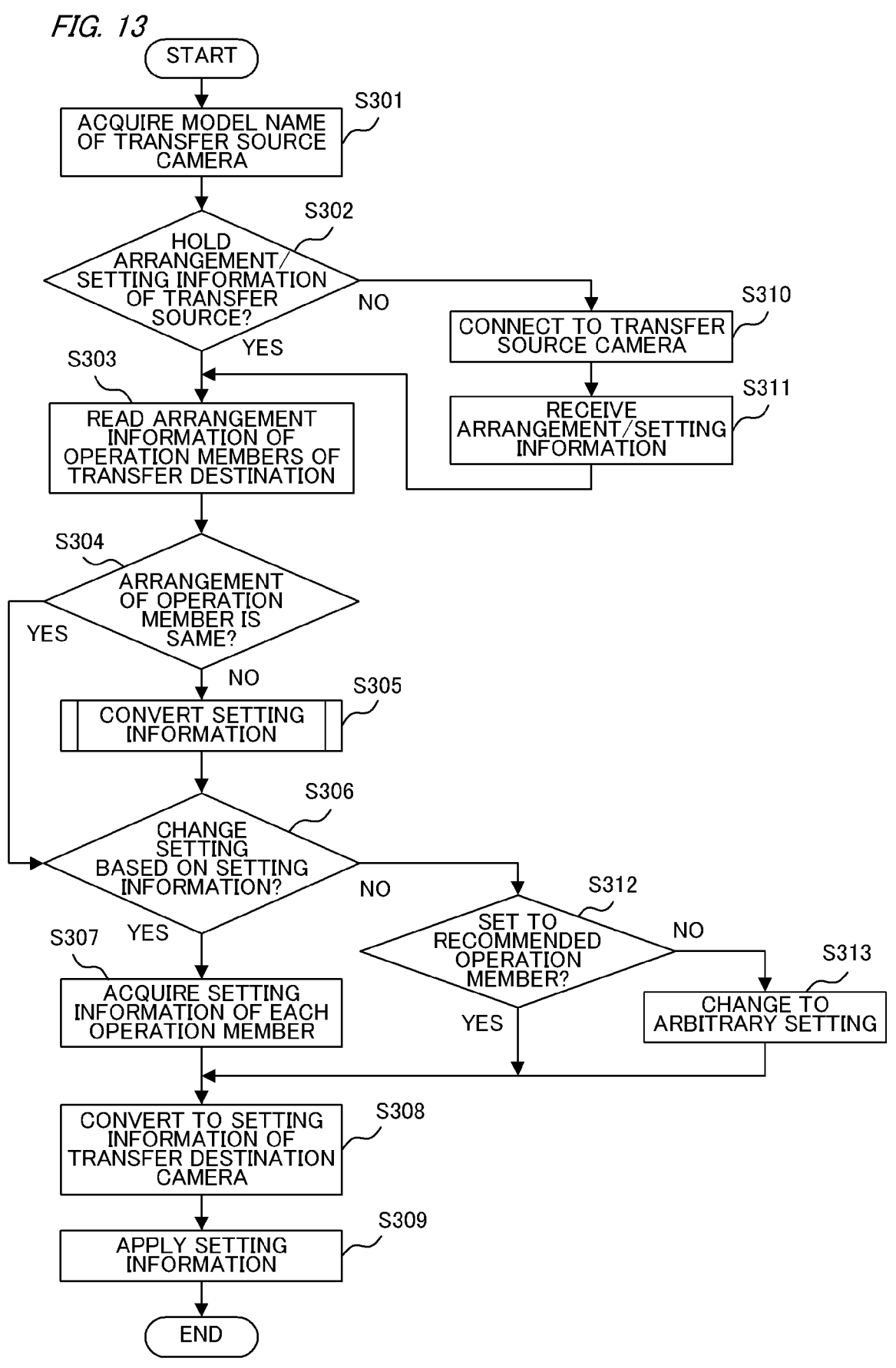
FIG. 13 is a flow chart exemplifying conversion processing of the setting information by the cameras.

The conversion processing of the setting information according to Embodiment 3 will now be described with reference to FIG. 13. The main unit to perform the processing in FIG. 13 is the system control unit 50 of the camera 100. FIG. 13 exemplifies the processing to transfer the setting information of the camera 200 at the transfer source to the camera 100 at the transfer destination, by the user operating the camera 100, but the present invention is not limited thereto. The processing to transfer the setting information of the camera 200 at the transfer source to the camera 100 may be executed by the user operating the camera 200 at the transfer source. Detailed description on the processing the same as the processing indicated in FIG. 7 will be omitted.

In step S301, the system control unit 50 of the camera 100 acquires a model name of the camera 200 at the transfer source. The system control unit 50 can, for example, acquire a model name inputted by the user from the operation unit 70 (e.g. touch panel 70*a*). The system control unit 50 may also acquire (receive) a model name by connecting to the camera 200 at the transfer source via the communication unit 54.

In step S302, the system control unit 50 determines whether the camera 100 holds the arrangement information and the setting information for the operation members of the camera 200 at the transfer source. For this, the system control unit 50 may determine whether the arrangement information and the setting information for the operation members of the camera 200 are stored in a storage unit of the camera 100, such as the system memory 52, the non-volatile memory 56 or the recording medium 185. The setting information of the operation members of the camera 200 includes information on the assignable function to each operation member and the use count thereof, as exemplified in FIG. 6A. If the camera 100 holds the arrangement information and the setting information for the operation members of the camera 200, processing advances to step S303. If the camera 100 does not hold the arrangement information and the setting information for the operation members of the camera 200, processing advances to step S310.

In step S310, the system control unit 50 connects to the camera 200 at the transfer source via the communication unit 54. The camera 100 and the camera 200 may be connected via cable or wireless, and may be connected using any communication protocol, such as PTP or HTTP.

In step S311, the system control unit 50 receives the arrangement information and the setting information of the operation members from the camera 200 at the transfer source via the communication unit 54. The setting information includes information on the use count of each operation member. In the case where the arrangement information for the operation members of the camera 200 is already held, the system control unit 50 may receive only the setting information. The system control unit 50 stores the information received from the camera 200 in a storage unit of the camera 100, such as the system memory 52, the non-volatile memory 56 or the recording medium 185.

In step S303, the system control unit 50 reads the arrangement information for the operation members of the camera 100 stored in the non-volatile memory 56.

In step S304, the system control unit 50 determines whether the arrangement of the operation members of the camera 200 at the transfer source and the arrangement of the operation members of the camera 100 read from the non-volatile memory 56 are the same. If the arrangement of the operation members is the same, the setting information for the operation members of the camera 200 at the transfer source is used as the setting information for the operation members of the camera 100 at the transfer destination. Processing advances to step S306 if the arrangement of the operation members is the same, and processing advances to step S305 if the arrangement of the operation members is not the same.

In step S305, the system control unit 50 executes the processing in FIG. 9, just like the step S106 in FIG. 7. That is, using the arrangement information and the setting information for the operation members, the setting information of the camera 200 at the transfer source is converted into the setting information of the camera 100 at the transfer destination. In Embodiment 3, the processing in FIG. 9 is executed based on the assumption that the CPU 301, the memory 302, the non-volatile memory 303 and the recording medium 308 are the system control unit 50 of the camera 100, the system memory 52, the non-volatile memory 56, and the recording medium 185 respectively.

In step S306, just like step S107 in FIG. 7, the system control unit 50 inquires to the user and determines whether the setting of the operation members of the camera 100 is changed based on the setting information. If the setting of the operation members of the transfer destination is changed based on the setting information presented on the display unit 28, processing advances to step S307. If the setting of the presented setting information is not changed, processing advances to step S312.

In step S312, the system control unit 50 determines whether the function assigned to an operation member at the transfer source is set for a recommended operation member of the camera 100. The recommended operation member can be an operation member of the camera 100 at the transfer destination, to which the function assigned to the operation member at the transfer source can be set (applied). The system control unit 50 displays on the display unit 28 the operation members of the camera 100 at the transfer destination, to which the function assigned to the operation member at the transfer source can be applied, and inquires to the user which operation member is selected.

The screen displayed on the display unit 28 in step S312 is the same as that in FIG. 8A, hence detailed description thereof will be omitted. Input from the user, in response to the inquiry, can be received via the operation unit 70, such as the touch panel 70*a*. If the user selects one of the operation members (recommended operation members) presented on the display unit 28, processing advances to step S308, and if the user does not select any of the operation members, processing advances to step S313.

In step S313, the system control unit 50 changes the setting to an arbitrary setting specified by the user. The system control unit 50 displays on the display unit 28 a customize screen, where the user arbitrarily sets a function assignment for the operation member to which the function assignment in the camera 100 can be applied. The customize screen displayed on the display unit 28 is the same as that in FIG. 8B, hence detailed description will be omitted. On the customize screen, the user can set an operation member of the camera 100 to which the setting for each operation member of the camera 200 is assigned.

In step S307, the system control unit 50 acquires the setting information assigned to each operation member of the camera 100 at the transfer destination. The setting information acquired here is the setting information converted in step S305. If the arrangement information of the camera 200 at the transfer source and the arrangement information of the camera 100 at the transfer destination are the same in step S304, the system control unit 50 may acquire the setting information of the camera 200 at the transfer source as the setting information to be assigned to each operation member of the camera 100 at the transfer destination.

In step S308, the system control unit 50 converts the setting information assigned to each operation member of the camera 100 at the transfer destination into a format corresponding to the camera 100 at the transfer destination. If the setting information applied to each operation member of the camera 100 at the transfer destination has a format corresponding to the camera 100, the processing in step S308 need not be executed. In step S309, the system control unit 50 applies (sets) the converted setting information to the operation members of the camera 100, and ends the conversion processing of the setting information indicated in FIG. 13.

In Embodiment 3 described above, the conversion of the setting information to transfer the setting of the camera 200 at the transfer source to the camera 100 at the transfer destination is executed by the camera 100 at the transfer destination. The camera 100 at the transfer destination acquires the arrangement information and the setting information for the operation members of the camera 200 at the transfer source, and converts the setting information of the camera 200 at the transfer source into the setting information of the camera 100 at the transfer destination, using the acquired information. The camera 100 at the transfer destination can receive the setting information of the camera 200 at the transfer source with a simple configuration, not using the smartphone 300, without diminishing operability of the user.

Preferred embodiments of the present invention have been described, but the present invention is not limited to these embodiments, and can be modified and changed in various ways within the scope of the spirit thereof.

According to the present invention, transfer of the setting information of an electronic apparatus can be implemented without diminishing operability of the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-185404, filed on Nov. 21, 2022, which is hereby incorporated by reference herein in its entirety.

What is claimed is:

1. An information processing apparatus comprising at least one memory and at least one processor which function as:
   an acquisition unit configured to acquire first information which includes information on use count of operation members of a first electronic apparatus, or to acquire second information which includes information on use count of operation members of a second electronic apparatus; and
   a determination unit configured to determine, based on the first information or the second information, a second operation member of the second electronic apparatus, to which setting for a first operation member of the first electronic apparatus is applied, in a case where settings for the operation members of the first electronic apparatus are applied to the operation members of the second electronic apparatus.

2. The information processing apparatus according to claim 1, wherein
   in a case where first arrangement of the operation members of the first electronic apparatus and second arrangement of the operation members of the second electronic apparatus are not approximately the same with respect to an operation member which is a setting applying target, the determination unit determines the second operation member of the second electronic apparatus, to which the setting for the first operation member of the first electronic apparatus is applied, based on the first information or the second information, and
   in a case where the first arrangement and the second arrangement are approximately the same with respect to the operation member which is the setting applying target, the determination unit determines the operation member of the second electronic apparatus, to which the setting for the first operation member of the first electronic apparatus is applied, as the operation member which approximately matches with the first operation member.

3. The information processing apparatus according to claim 1, wherein
   in a case where the setting for the first operation member of the first electronic apparatus is applicable to the operation member of the second electronic apparatus corresponding to the first operation member, the determination unit determines the operation member of the second electronic apparatus, to which the setting for the first operation member of the first electronic apparatus is applied, as the operation member of the second electronic apparatus corresponding to the first operation member, and
   in a case where the setting for the first operation member of the first electronic apparatus is not applicable to the operation member of the second electronic apparatus corresponding to the first operation member, the determination unit determines the second operation member of the second electronic apparatus, to which the setting for the first operation member of the first electronic apparatus is applied, based on the first information or the second information to.

4. The information processing apparatus according to claim 1, wherein out of the operation members of the second electronic apparatus, the determination unit determines an operation member, of which index based on the use count is closest to index based on the use count of the first operation member, as the second operation member.

5. The information processing apparatus according to claim 1, wherein the at least one memory and the at least one processor further function as a control unit configured to inquire of a user whether the second operation member determined by the determination unit is employed as an operation member to which the setting for the first operation member is applied.

6. The information processing apparatus according to claim 5, wherein in a case where the user does not employ the second operation member as the operation member to which the setting for the first operation member is applied, the control unit controls to present candidates of the operation members of the second electronic apparatus to which the setting for the first operation member is applicable.

7. The information processing apparatus according to claim 1, wherein the use count of the operation members of the first electronic apparatus or the use count of the operation members of the second electronic apparatus is a number of times added up during a predetermined period.

8. The information processing apparatus according to claim 1, wherein the use count of the operation members of the first electronic apparatus and the use count of the operation members of the second electronic apparatus are added up for each user.

9. The information processing apparatus according to claim 1, wherein the use count of the operation members of the first electronic apparatus and the use count of the operation members of the second electronic apparatus are added up for each combination of an operation member and setting for the operation member.

10. The information processing apparatus according to claim 1, wherein the use count of the operation members of the first electronic apparatus and the use count of the operation members of the second electronic apparatus are initialized by an operation of a user.

11. The information processing apparatus according to claim 1, wherein the use count of the operation members of the first electronic apparatus and the use count of the operation members of the second electronic apparatus are initialized in a case where the settings for the operation members are changed.

12. The information processing apparatus according to claim 1, wherein the first information includes arrangement information for the operation members of the first electronic apparatus, the second information includes arrangement information of the operation members of the second electronic apparatus, and the determination unit determines the second operation member based on the arrangement information for the operation members of the first electronic apparatus and the arrangement information for the operation members of the second electronic apparatus.

13. The information processing apparatus according to claim 12, wherein out of the operation members of the second electronic apparatus, the determination unit determines, as the second operation member, an operation member of which relative position with respect to a reference operation member of the second electronic apparatus is closest to a relative position of the first operation member with respect to the reference operation member of the first electronic apparatus.

14. The information processing apparatus according to claim 1, wherein the setting for the first operation member is setting of a function assigned to the first operation member.

15. The information processing apparatus according to claim 1, wherein the information processing apparatus is the first electronic apparatus or the second electronic apparatus.

16. An information processing method for causing a computer to execute:

an acquisition step of acquiring first information which includes information on use count of operation members of a first electronic apparatus, or acquiring second information which includes information on use count of operation members of a second electronic apparatus; and a determination step of determining, based on the first information or the second information, a second operation member of the second electronic apparatus, to which setting for a first operation member of the first electronic apparatus is applied, in a case where settings for the operation members of the first electronic apparatus are applied to the operation members of the second electronic apparatus.

17. A non-transitory computer-readable medium that stores a program for causing a computer to execute an information processing method comprising:

an acquisition step of acquiring first information which includes information on use count of operation members of a first electronic apparatus, or acquiring second information which includes information on use count of operation members of a second electronic apparatus; and a determination step of determining, based on the first information or the second information, a second operation member of the second electronic apparatus, to which setting for a first operation member of the first electronic apparatus is applied, in a case where settings for the operation members of the first electronic apparatus are applied to the operation members of the second electronic apparatus.

* * * * *